United States Patent
Wang et al.

(10) Patent No.: US 8,987,631 B2
(45) Date of Patent: Mar. 24, 2015

(54) METHOD AND APPARATUS FOR WELDING TO LAMINATED METAL

(75) Inventors: Pei-Chung Wang, Troy, MI (US); Robert J. Gollehur, Macomb Township, MI (US); James F. Hengel, Romeo, MI (US); Narayanan P. Menon, Bloomfield Hills, MI (US); Mark D. Gugel, Kelkheim (DE); Alexander Michael Turley, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2759 days.

(21) Appl. No.: 11/440,826

(22) Filed: May 25, 2006

(65) Prior Publication Data

US 2007/0272660 A1 Nov. 29, 2007

(51) Int. Cl.
  *B23K 11/10* (2006.01)
  *B23K 11/14* (2006.01)
  *B23K 11/00* (2006.01)

(52) U.S. Cl.
  CPC ............ *B23K 11/14* (2013.01); *B23K 11/0053* (2013.01); *B23K 2203/16* (2013.01)
  USPC .................................. 219/93; 219/81; 219/84

(58) Field of Classification Search
  USPC ......................................... 219/92, 93, 81, 84
  See application file for complete search history.

(56) References Cited

U.S. PATENT DOCUMENTS

| | | | |
|---|---|---|---|
| 3,975,611 A * | 8/1976 | Gordon ........................... | 219/98 |
| 5,714,730 A * | 2/1998 | Geiermann et al. ........ | 219/86.25 |
| 6,350,969 B1 * | 2/2002 | Rothchild ..................... | 219/505 |
| 6,732,431 B2 * | 5/2004 | Muller ............................ | 29/874 |
| 6,818,851 B2 * | 11/2004 | Ramasamy et al. ............ | 219/98 |

FOREIGN PATENT DOCUMENTS

JP          63238977 A  * 10/1988  ............... B23K 9/20

* cited by examiner

*Primary Examiner* — Henry Yuen
*Assistant Examiner* — Ayub Maye

(57) ABSTRACT

A method is provided for the projection electric resistance welding of a component to a laminated metal member. The laminated metal member is comprised of top and bottom metal sheets adhered together by a polymer layer provided between the top and bottom metal sheets. A plurality of projections is provided on the component and the projections extend toward the top metal sheet of the laminated metal. Force is applied to the component and the projections have a pointed shape so that the projections pierce through the top metal sheet and contact the bottom metal sheet. Weld current is then applied to flow through the projections so that the projections are electric resistance welded to both the top and bottom metal sheets.

11 Claims, 2 Drawing Sheets

METHOD AND APPARATUS FOR WELDING TO LAMINATED METAL

FIELD OF THE INVENTION

The present invention relates to a method for welding a fastener or other component to a laminated metal panel.

BACKGROUND OF THE INVENTION

It is known in modern automobile manufacture to employ laminated metal, particularly laminated steel, in the forming of components such as oil pans, rocker covers, wheelhouse inners and front-dash structures. Laminated metal is comprised of two sheets of metal, such as steel, aluminum or magnesium, with a layer of polymer interposed there between. Laminated metal is known to provide a good combination of vibration damping properties and high strength-to-weight ratios and is accordingly of interest to the exacting performance demands of the automobile industry.

It is known to weld fasteners and other components to the laminated metal by conventional welding processes such as projection resistance welding. However, in such processes, the fastener is welded to only the outer layer of metal of the laminated metal, rather than to both layers of metal. In addition, the use of electric resistance welding is complicated by the fact that the layer of polymer acts as a dielectric to retard to flow of welding current through the laminated metal.

SUMMARY OF THE INVENTION

A method is provided for the projection electric resistance welding of a component to a laminated metal member. The laminated metal member is comprised of top and bottom metal sheets adhered together by a polymer layer provided between the top and bottom metal sheets. A plurality of projections is provided on the component and the projections extend toward the top metal sheet of the laminated metal. Force is applied to the component and the projections have a pointed shape so that the projections pierce through the top metal sheet and contact the bottom metal sheet. Weld current is then applied to flow through the projections so that the projections are electric resistance welded to both the top and bottom metal sheets.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
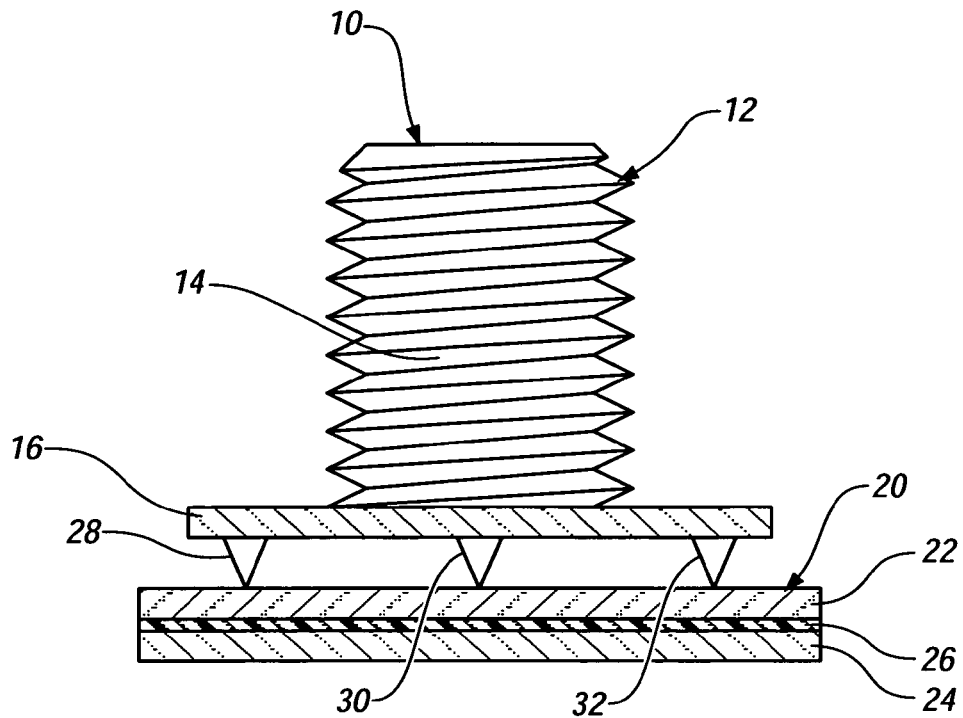
FIG. 1 is an elevation view of a fastener resting upon a sheet of laminated metal.

Referring to FIG. 1, a component 10, more particularly a bolt 12. Bolt 12 includes a threaded shank 14 and a head 16 that is to be welded to a sheet of laminated metal 20. The sheet of laminated metal 20 includes a top layer 22 of sheet metal, a bottom layer 24 of sheet metal and a middle layer of polymer 26 that binds the top layers 22 and the bottom layer 24.

As seen in FIG. 1, projections 28, 30 and 32 are provided on the head 16 on the side thereof opposite to the threaded shank 14. The projections may be cold headed during the conventional manufacture of the treaded shank 14, or otherwise formed thereon as convenient to the bolt manufacturing process.

The projections are sharpened or pointed at their tips to enable the projections to pierce through the laminated metal 20 as will be described in particular hereinafter.

Figure 2:
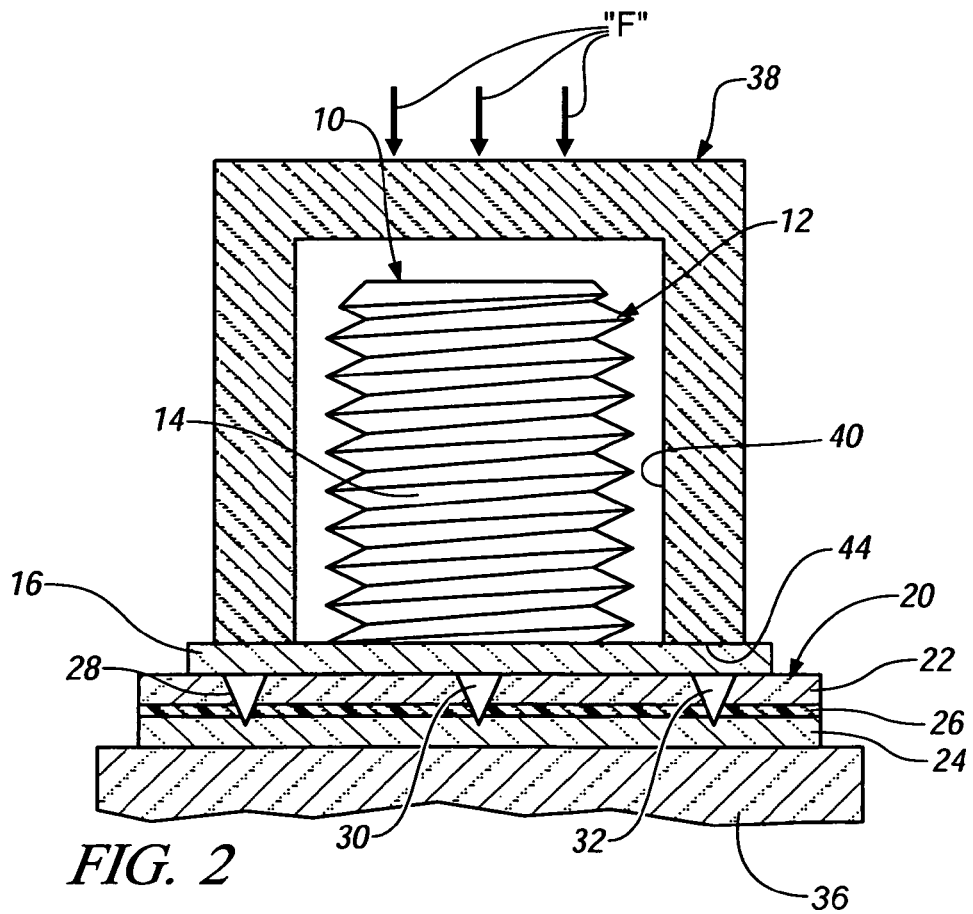
FIG. 2 is an elevation view having parts broken away and in section showing the laminated metal supported by a back-up electrode and a movable electrode forcing sharp projections formed on the fastener to pierce through the top layer of sheet metal and polymer and into contact with the bottom layer of sheet metal; and, FIG. 3 is an elevation view having parts broken away and in section showing the fastener welded to the laminated metal.

FIG. 2 shows the laminated metal 20 supported by a backup electrode 36 that engages with the bottom layer 24 of sheet metal. A welding electrode 38 is seated over top the bolt 12 and has a bore 40 that receives the threaded shank 14 and an end face 44 that engages with the head 16 of the bolt 12. The welding electrode 38 is mounted on a press or hydraulic cylinder. As seen in FIG. 2, force is applied to the electrode 38 in the direction of arrows "F" and causes the bolt 12 to be forcibly advanced toward the laminated metal 20 so that the pointed projections 28, 30 and 32 are caused to pierce through the top layer 22, and through the polymer layer 26. The length of the projections is such that the projections 28, 30, and 32 also pierce into the bottom layer 24, or at least come into close contact or near close contact with the bottom layer 24. Thus, although the presence of the layer 26 would normally prevent the flow of electrical current between the top and metal sheets 22 and 24, the projections 28, 30 and 32 will provide a path for flow of electrical current.

Figure 3:
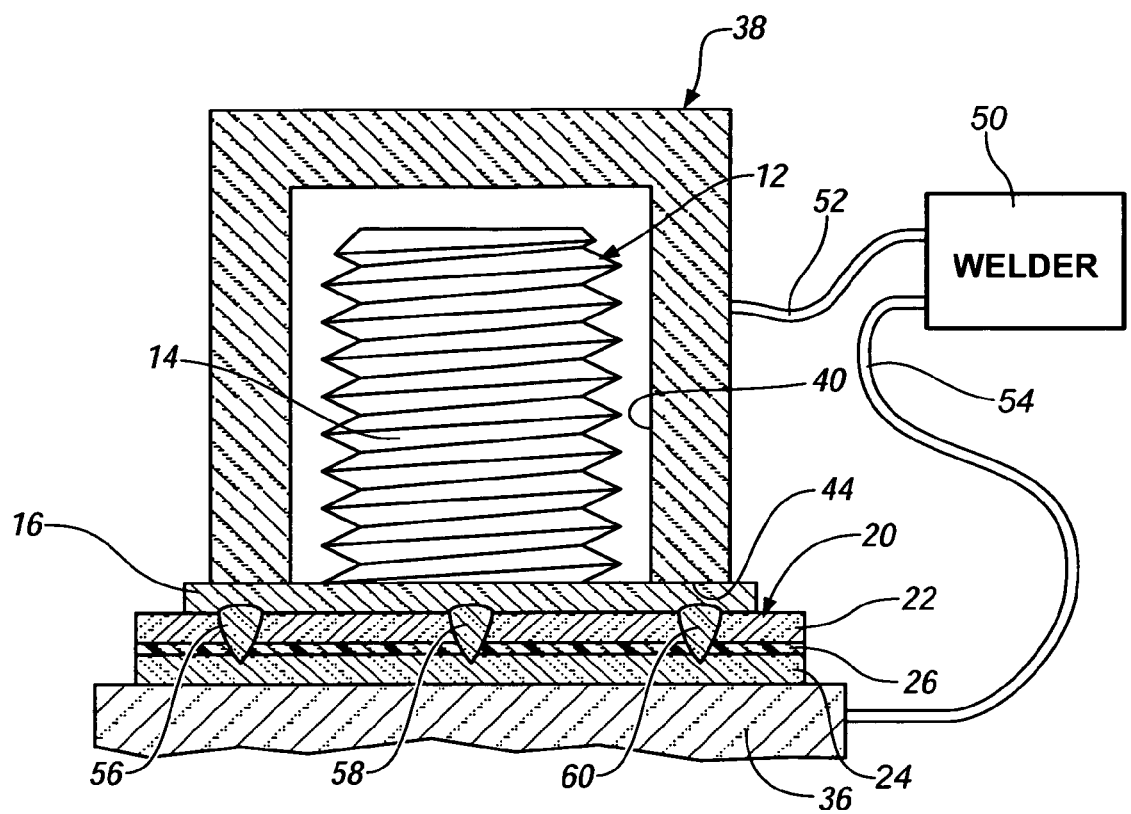

A welder 50 is connected to the weld electrode 38 by a cable 52 and to the back up weld electrode 36 by a cable 54. After the projections of the bolt 12 have pierced though the laminated metal 20 as shown in FIG. 2, weld current is applied to the weld electrode 38 and back up electrode 36, so that the weld current passes through the head 16 and its projections 28, 30 and 32 to the laminated metal top layer 22 and bottom layer 24. This induces electrical resistance heating and welding so that welds 56, 58 and 60 are formed as shown in FIG. 3.

It will be appreciated that the welds 56, 58 and 60 reach between the bolt head 16 and both metal layers of the laminated metal. Thus when either axial force or torque is applied to the bolt 12 during its eventual use in an automobile or other products, the bolt 12 will have the advantage of being fixedly attached to both layers of the laminated metal 20.

The foregoing description of the invention is merely exemplary in nature and, thus, variations thereof are intended to be within the scope of the invention. For example, although the drawing shows the component 10 as being a bolt 12, the component could be a rivet, a threaded nut, or some other type of fastener. Alternatively the component could be a mounting bracket or other component that is to be welded directly to the laminated metal 20 rather than being attached to the laminated metal by a fastener such a the bolt 12.

Although the example shown herein has three projections 28, 30 and 32, it will be appreciated that any number of projections can be employed, depending upon how many welds are desired. In addition, the length of the projections can vary, provided however that the projections assure the formation of the weld nugget to fuse with the bottom layer 24 of the laminated metal 20.

What is claimed is:

1. A method for projection electric resistance welding of a component to a laminated metal member having top and bottom metal sheets with a polymer layer between the top and bottom metal sheets; comprising:
    providing a plurality of projections upon the component, said projections extending toward the top metal sheet of the laminated metal and being shaped to permit the projections to pierce through metal;
    placing the component on the top metal sheet of the laminated metal member and applying force to the component so that the projections pierce through the top metal sheet and contact the bottom metal sheet;
    and applying weld current to flow between the component and the bottom metal sheet so that the projections are electric resistance welded to both the top and bottom metal sheets.

2. The method of claim 1 in which a back up electrode is applied to the bottom metal sheet and a movable electrode engages with the component.

3. The method of claim 2 in which the movable electrode applies force to the component to cause the projections to pierce through the top metal sheet.

4. The method of claim 1 in which the component is a fastener.

5. The method of claim 1 in which the component is a bolt and the projections are formed on the head of the bolt.

6. The method of claim 1 in which the projections are sufficiently long to assure that the projections engage with the bottom metal sheet after piercing through the top metal sheet.

7. The method of claim 2 in which the electric current is applied by a source of resistance electric weld current source that is connected to the back up electrode and the movable electrode.

8. A method for projection electric resistance welding of a head of a fastener to a laminated metal member having top and bottom metal sheets with a dielectric polymer layer between the top and bottom metal sheets; comprising:
    providing a plurality of projections upon the fastener, said projections extending toward the top metal sheet of the laminated metal and being shaped to permit the projections to pierce through metal;
    placing the fastener head on the top metal sheet of the laminated metal member;
    engaging the faster with an electrode and engaging the bottom metal sheet of the laminated metal with an electrode;
    applying force to the electrodes so that the projections of the fastener head pierce through the top metal sheet and contact the bottom metal sheet to provide an electrically conductive path through the dielectric polymer layer;
    and applying weld current to flow between the fastener and the bottom metal sheet so that the projections are electric resistance welded to both the top and bottom metal sheets.

9. The method of claim 8 in which the projections have a pointed shape.

10. The method of claim 8 in which the length of the projections cause the projection to pierce through the top layer of metal and pierce at least part way into the bottom layer of metal.

11. The method of claim 8 in which the length of the projections cause the projections to pierce fully through the top layer of metal and extend at least sufficient close to the bottom layer of metal to permit flow of the electrical current between the top and bottom layers and to form a weld nugget that extends between the top and bottom layer of metal and attaches the fastener to both the top and bottom layers.

\* \* \* \* \*